United States Patent [19]

Linton

[11] Patent Number: 4,615,286

[45] Date of Patent: Oct. 7, 1986

[54] GRAIN DRILL MOUNTED HARROW DEVICE

[76] Inventor: Kenneth D. Linton, Rte. 1, Box 155, Van Wert, Ohio 45891

[21] Appl. No.: 732,165

[22] Filed: May 8, 1985

Related U.S. Application Data

[63] Continuation of Ser. No. 460,929, Jan. 25, 1983, abandoned.

[51] Int. Cl.$^4$ ............................................... A01C 5/00
[52] U.S. Cl. ...................................... 111/52; 172/706
[58] Field of Search ............... 172/707, 706, 142, 643; 111/1, 52, 59, 61, 62, 66, 69, 85, 83

[56] References Cited

U.S. PATENT DOCUMENTS

| | | |
|---|---|---|
| 1,066,481 | 7/1913 | Forkner . |
| 1,493,448 | 5/1924 | Krotz ................................. 172/706 |
| 2,157,702 | 5/1939 | Hake ................................. 172/643 |
| 2,187,898 | 1/1940 | Charles .............................. 172/706 |
| 3,245,479 | 4/1966 | Dlugosch et al. ............... 172/643 X |
| 3,314,386 | 4/1967 | Kopaska ............................ 111/52 |
| 3,389,754 | 7/1968 | Allison ............................. 111/1 X |
| 3,523,585 | 8/1970 | Godbersen ......................... 172/706 |
| 3,682,252 | 8/1972 | Gates .............................. 111/66 X |
| 4,103,628 | 8/1978 | Gaston ............................. 111/52 |

OTHER PUBLICATIONS

Emmert, "Minimum Tillage Planter Harrow", 9/72, *Implement Sales Publication Emmert Mfg. Co.*, Audubon, Iowa.

Tye "One Drill is All You Need", Implement Sales Publication, *The Tye Company Lockney*, Texas, 1/82.

*Primary Examiner*—James R. Feyrer
*Assistant Examiner*—Danton DeMille
*Attorney, Agent, or Firm*—Roger M. Rickert

[57] ABSTRACT

An attachment for a tractor drawn grain drill is disclosed having a horizontal array of harrow tines staggered along a plurality of transverse rows with each row commonly supported by a rotatable control rod with a tine coiled portion encircling the control rod and one tine end fixed thereto while the other tine end extends away from the rod a distance sufficient to engage and till the earth when the other tine end is directed generally downwardly. Each control rod has a lever arm extending away from the rod and pivotally coupled to one or more control links so that link movement induces rotation of the control rods for pivoting the entirety of tines simultaneously between earth engaging and generally horizontal stowed positions. A hydraulic arrangement remotely controllable by a tractor operator is provided for moving the control links to raise or lower the tines and the hydraulic arrangement may further be coupled to enable or disable the grain drill. The harrow device is suspended beneath a leading portion of the grain drill with the harrow device leading edge being suspended from a hitch portion of the grain drill and the trailing edge of the harrow device being suspended from a forward portion of the main body of the grain drill. Thus, the only coupling required between a tractor and the grain drill is a hitch and a pair of hydraulic lines for actuating the hydraulic cylinder.

1 Claim, 6 Drawing Figures

GRAIN DRILL MOUNTED HARROW DEVICE

This is a continuation of application Ser. No. 460,929, filed Jan. 25, 1983, now abandoned.

BACKGROUND OF THE INVENTION

The present invention relates generally to improvements in agricultural implements and more particularly to an earth tilling attachment for a seed planting implement which is operative intermediate a drawing tractor and the planting implement to retill and smooth dirt compacted by passage of the tractor preparatory to the planting operation.

Mechanization of the farming industry has provided tremendous production with a small expenditure of labor. Such mechanized farm equipment is, however, relatively expensive both in initial investment and operating costs. Implement cost reduction and reduced operating time therefore remain paramount concerns to the agriculture industry.

A number of schemes for tilling ground immediately prior to a planting operation have been proposed with such schemes typically suffering from one or more of the following drawbacks: high initial implement costs; requiring one pass for the tilling operation and a second pass for the planting operation; difficult and complex procedures for coupling a tractor to the tilling device; complex operator controls requiring operator skill and concentration as well as operator familiarity with the particular tilling implement; and, difficulty in preparing and transporting the tilling implement on public roads between work sites.

One such scheme is to pull a conventional peg tooth or spring tooth harrow between a tractor and a planter. In such a scheme, the tractor is hitched to the harrow and the harrow in turn is hitched to the planter, and with such an arrangement the initial coupling of the three items is somewhat difficult and time consuming and the resulting arrangement is awkward to control, particularly when attempting sharp turns near corners of a field.

It would be highly desirable to obviate the above recited problems and to provide a practical preplanting tiller arrangement requiring low capital expenditure and virtually no increase in planting time.

SUMMARY OF THE INVENTION

Among the several objects of the present invention may be noted the avoidance of the above noted problems and achievement of the above noted goals; the provision of a combined harrow and planting device characterized by its ease of coupling to a tractor; the provision of a device which can be used for replanting areas which fail to germinate without the need of extra equipment or multiple field passes to achieve such replanting; the provision of a planting device including a tilling arrangement intermediate a drawing tractor and the planting device which eliminates the tractor tracks ahead of the planting device thereby reducing compaction in the seed bed; and, the provision of a low cost harrow device easily mounted to planters to be drawn therewith during a planting operation.

In general, a harrow device for suspension beneath the leading edge of a tractor drawn wheel actuated seed planting implement of the type which forms seed receiving openings, deposits the seeds therein and subsequently covers the deposited seeds with loose earth has a laterally extending horizontal array of rotatably supported control rods each supporting a plurality of individual tines extending generally perpendicular to the control rod and parallel to one another so that control rod rotation rotates the tines between a downwardly extending tilling position and a retracted position for transporting and storing the device. The rods are rotated in unison by a hydraulic cylinder and control linkage coupling that cylinder to control rod lever arms. Further linkages may be provided for enabling and disabling the grain drill under the control of the same hydraulic arrangement which raises and lowers the tines. Like linkages bilaterally symmetric with the hydraulic arrangement may be employed to eliminate binding of the linkage arrangements due to torsional effects. In its preferred embodiment the harrow device is suspended near its leading edge from a hitch portion of the grain drill and near its trailing edge from a forward portion of the main body of the grain drill.

BRIEF DESCRIPTION OF THE DRAWINGS

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
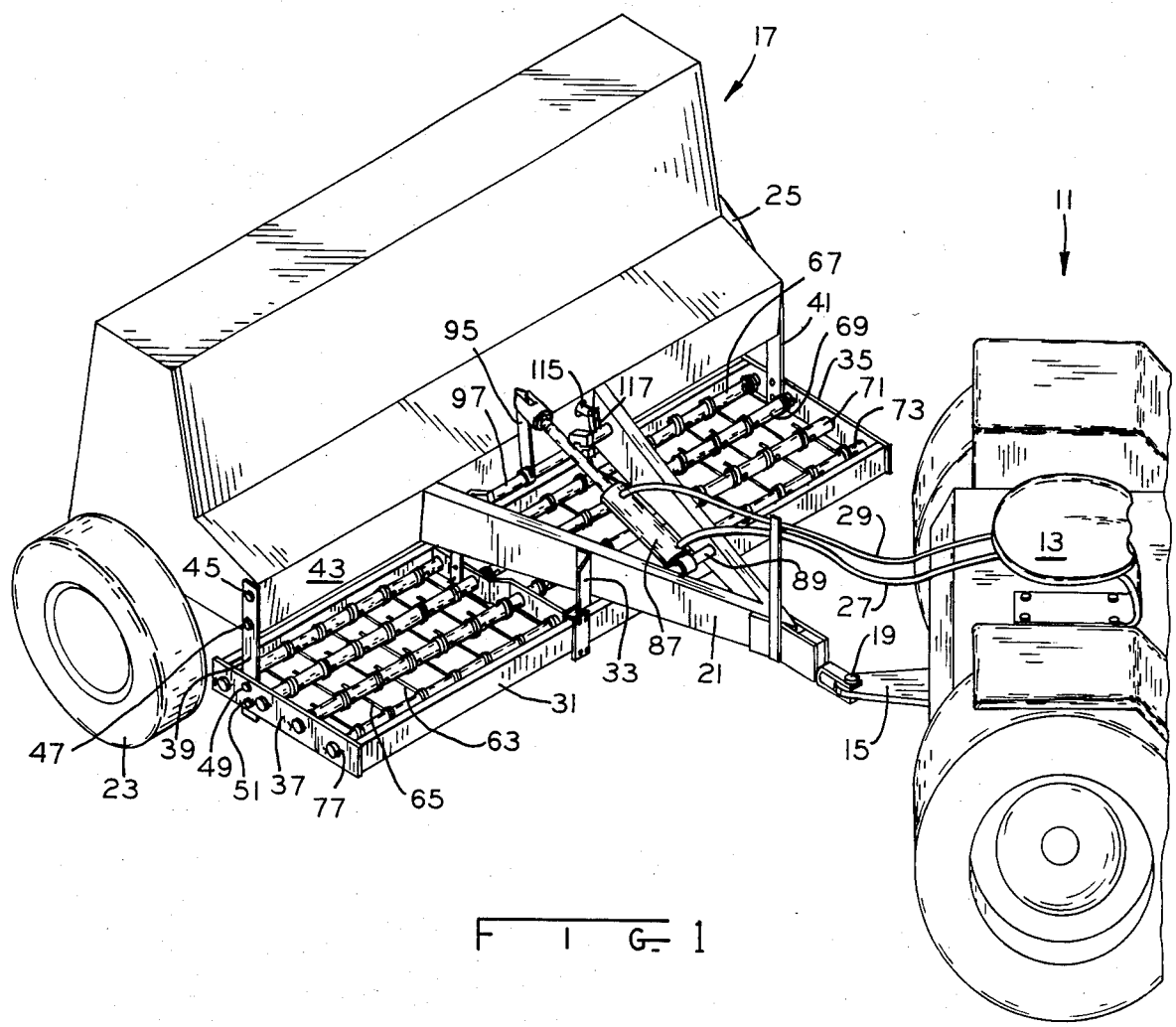
FIG. 1 is a perspective view of a grain drill supporting the harrow device and coupled to a tractor.

Referring first to FIG. 1 and briefly to aspects of the present inventive combination which are conventional, there is illustrated generally a rear fragment of a farm tractor 11 having a tractor operator's seat 13 and a hitch portion 15 for coupling to drawn implements. A wheel actuated seed planting implement or grain drill 17 having conventional seed hoppers and conventional mechanisms for forming seed receiving openings in the earth, depositing seeds in those openings, and covering the deposited seeds with loose earth is coupled to the tractor hitch 15 by drawpin 19 and tongue 21 of the planter. Planter 17 has wheels 23 and 25 which are coupled to the grain hoppers by a conventional arrangement (not shown) which effectively make the planter 17 self powered in that its movement along the ground and rotation of wheels 23 and 25 dispenses the seed from the hoppers. Outside the mechanical hitch arrangement the only connection between the planter 17 and tractor 11 is a pair of hydraulic lines 27 and 29 which connect to conventional controls and hydraulic source on the tractor 11. The features thus far discussed, are conventional and a wide variety of sources may be consulted for additional details thereof.

Still referring to FIG. 1, the harrow device of the present invention is seen to include a rectangular frame of hollow metal tubular construction having a leading edge frame member 32 suspended from the tongue 21 by bracket 33 and with side portions 35 and 37 suspended near the trailing edge by bracket members 29 and 41 from the forward portion 43 of the main body of the grain drill implement 17. The harrow device may be suspended beneath the leading portion of the implement 17 a preferred elevation above the earth by selecting appropriately the mounting holes for mounting bolts such as 45 and 47, 49 and 51. The harrow device is similarly slung from tongue attachment points to be rigidly supported at its preferred elevation.

Figure 2:
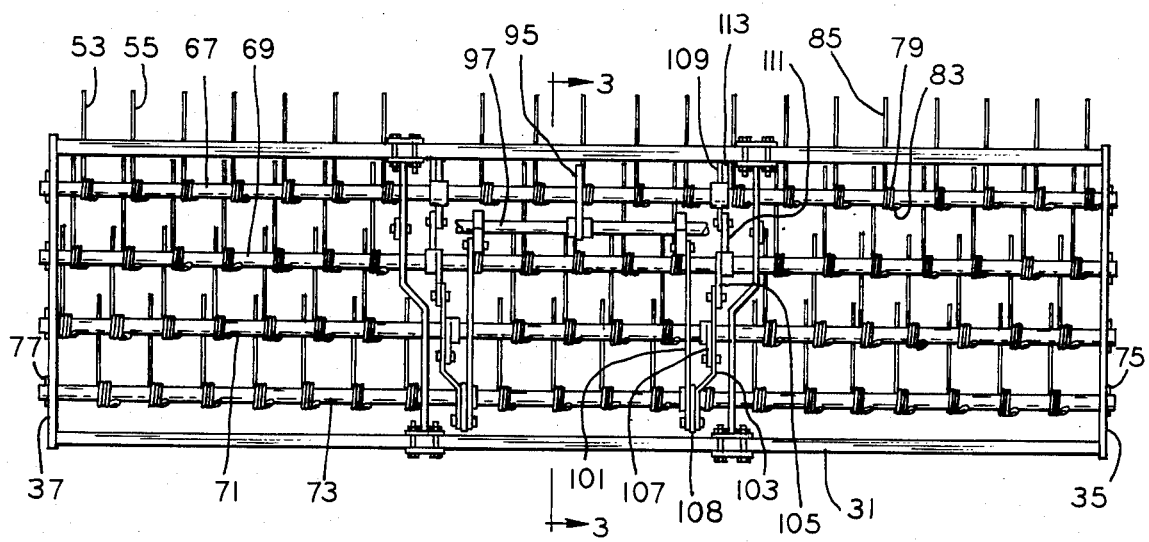
FIG. 2 is a top view of the harrow device of FIG. 1 separated from the grain drill.
Figure 4:
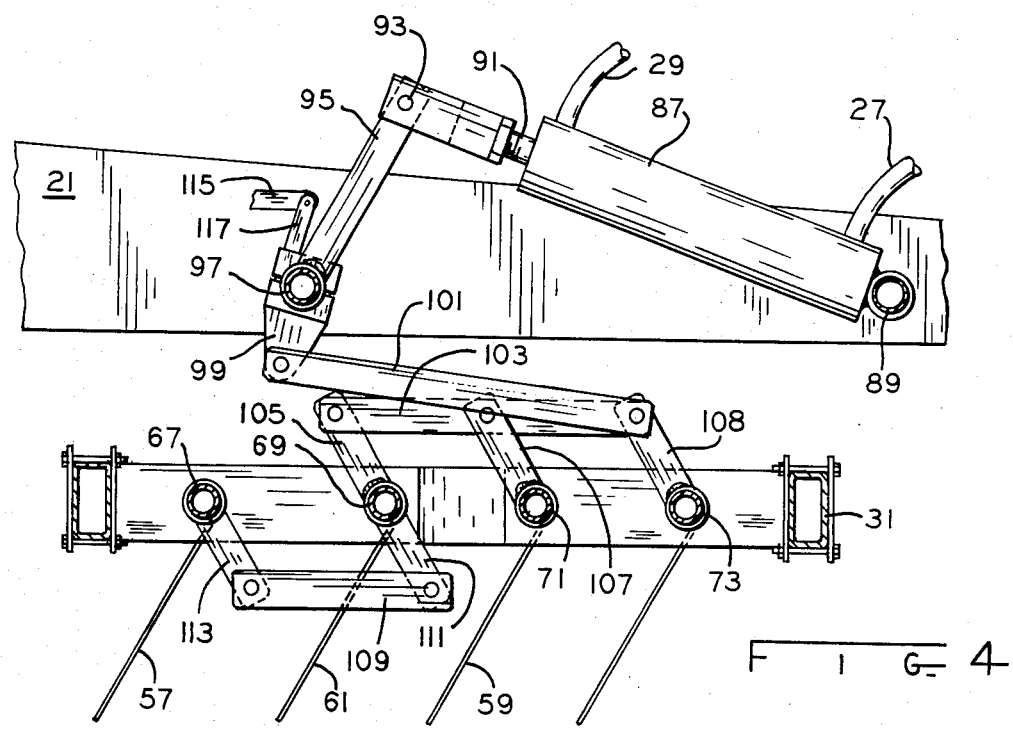
FIG. 4 is a view similar to FIG. 3 but illustrating the tines in their extended tilling position.
Figure 5:
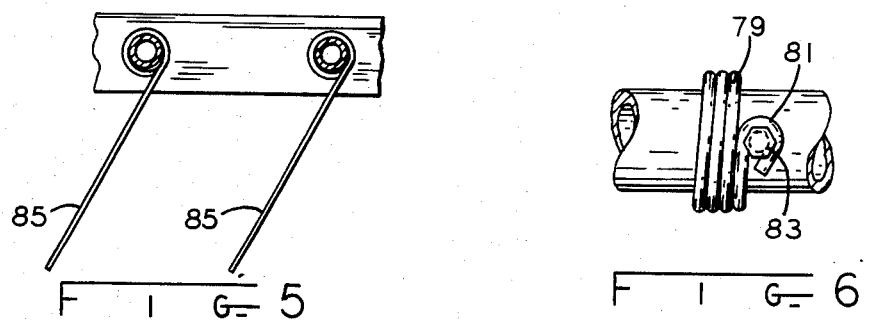
FIG. 5 illustrates a pair of tilling tines in their extended position.
Figure 6:
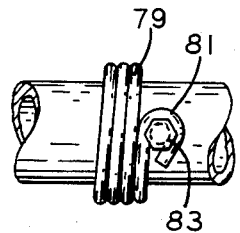
FIG. 6 illustrates the manner of attachment of individual tines to their respective control rods.

Referring now to the details of the suspended harrow device and to the drawing generally, the ground tilling elements comprise an array of harrow tines such as 53, 55, 57, 59, 61, 63 and 65 which are seen to be generally horizontally disposed in a plurality of transverse rows with each row corresponding to a tine control rod such as 67, 69, 71 and 73. The control rods are rotatably supported, for example, by passing through holes in the frame sidewalls 35 and 37 and secured therein by cotter pins such as 75 and 77 so that the control rods extend in a mutually parallel, horizontal pattern with each being rotatable around its respective horizontally extending axis. As best seen in FIGS. 1, 2 and 6 each tine has a coiled portion snuggly helically encircling its respective control rod and wrapped thereabout a plurality of times as illustrated at 79 with one tine end 81 fixed to the control rod as by a bolt 83 and the other tine end 85 extending away from the control rod by a distance which exceeds the elevation of that control rod above the earth so that when the tine free ends are extending downwardly, as illustrated in FIGS. 4 and 5, those tines engage the earth for tilling purposes. The coiled portions of the tines, which snuggly encircle the control rods, gives those tines some of the resilience characteristic of a conventional spring tooth (spiralling) harrow arrangement with a more positive action characteristic of the conventional peg tooth harrow.

Figure 3:
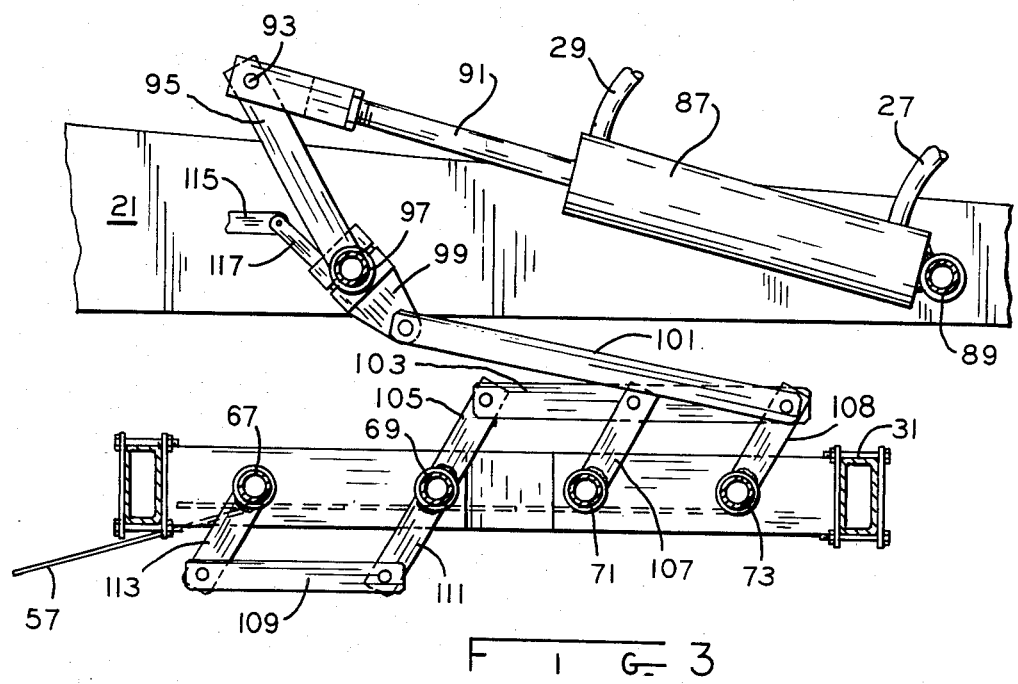
FIG. 3 is a view along the lines 3—3 of FIG. 2 also including a portion of the harrow device tongue and hydraulic arrangement for raising and lowering the tines.

Rotation of the several control rods such as 67 to pivot the harrow tines, such as 57, in unison between a stowed ineffective position, for example for transporting the arrangement from site to site as illustrated in FIG. 3 and an extended position as illustrated in FIG. 4 for a tilling operation, is accomplished by selectively energizing a hydraulic cylinder 87. This hydraulic cylinder is remotely controllable by a tractor operator seated on seat 13 to supply hydraulic fluid by way of lines 27 and 29 from a conventional tractor hydraulic source. The hydraulic cylinder 87 is pivotally fastened to the implement tongue at one end on rod 89 and has a piston rod 91 extending from the other cylinder end which is selectively extendable (FIG. 3) and retractable (FIG. 4) in response to the supplying of hydraulic fluid thereto. This piston rod 91 is pivotally coupled at 93 to an actuating rod 95 which is journaled on the implement tongue 21 by pipe 97 to be rotatably about the axis of that pipe. Thus, the axis of pipe 97 as well as the pivot axis associated with the cross member 89 are generally parallel to but displaced upwardly from the axes of the several control rods, such as 67. The actuating rod 97 has arm 95 fixed thereto and extending therefrom and also has a pair of additional arms 99 symmetrically positioned about arm 95 and fixed to the actuating rod 97 to be pivotably coupled or linked by a like pair of links 101 to a similar pair of control links 103. The control links such as 103 are in turn pivotally coupled to lever arms 105, 107 and 108 each fixed to a corresponding control rod. Due to space considerations directly beneath the front edge of the grain drill 17, an optional or auxiliary control link 109 extends somewhat beneath the mechanism to couple arms 111 and 113 of control rods 69 and 67, respectively. In many cases this optional link is unnecessary.

Thus, during transportation, storage or other periods of nonuse the hydraulic system and linkages are generally in the configuration illustrated in FIG. 3. Preparatory to a planting operation, the operator energizes certain conventional tractor control elements to supply hydraulic fluid through line 29 to the cylinder 87 and to drain fluid from the cylinder by way of line 27. This causes the piston rod 91 to be retracted into cylinder 87 and in turn causes the links 95 and 99 to pivot clockwise as viewed about the axis of rod 97. This pivoting motion pulls links 101 and 103 generally toward the left as viewed while moving link 109 generally toward the right as viewed causing a counterclockwise rotation of each of the control rods 67, 69, 71 and 73 and simultaneous counterclockwise movement of the tines such as 57 from the position illustrated in FIG. 3 to that illustrated in FIG. 4 for subsequent tilling purposes.

The planting implement 17 may be of the type powered by rotation of its own wheels 23 and 25 by a coupling mechanism, not shown. The disabling of that coupling mechanism as well as the raising of downwardly protruding members that engage the soil during a planting operation may be accomplished by moving the grain drill control links 115 rearwardly into the front of the grain drill. Such lateral movement of the grain drill control links 115 may be accomplished by providing one or more additional control arms such as 117 on the pivotable rod 97. Thus, the position of the control arm 115 illustrated in FIG. 3 corresponds to a disabled mode for the implement while the position of that member 115 in FIG. 4 corresponds to a planting or enabled mode of the planting implement 17.

From the foregoing it is now apparent that a novel harrow device for suspension from a planting implement intermediate the implement and a tractor has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In a tracter drawn wheeled seed planting implement of the conventional type which forms seed receiving openings in the earth, deposite seeds in such openings, and covers the deposited seeds with loose earth, the improvement comprising a removable harrow device suspended beneath a leading portion of the planting implement near a leading edge of the harrow device from a tongue portion of the implement and near a trailing edge of the harrow device from a forward portion of the main body of the implement so as to be positioned intermediate and suspended entirely by the tractor and planting implement to retill and smooth dirt compacted by passage of the tractor preparatory to the planting operation, seed planting by the implement being selectively actuated by rotation of its wheels and the planting implement including a mechanical linkage arrangement for selectively placing the implement in a planting mode and a disabled mode, the harrow device including:

- a generally horizontally disposed array of harrow tines arranged generally in a plurality of transverse rows;
- a plurality of tine control rods, one associated with each transverse row, the control rods rotatably supported in a mutually parallel horizontal pattern, each tine having a coiled portion for snuggly helically encircling a control rod with one tine end fixed to a control rod and the other tine end extending away from the control rod a distance exceeding the elevation of the control rod above the earth;
- at least one lever arm fixed to and extending from each control rod;
- control link means pivotably coupled to one lever arm of each of the control rods whereby control link movement induces rotation of each of the lever arms and correlative rotation of each of the control rods for pivoting the entirety of tines supported on the control rods simultaneously between earth engaging and generally horizontal stowed positions;
- hydraulic means remotely controllable by a tractor operator for moving the control link means to raise and lower the tines, the hydraulic means including an elongated hydraulic cylinder pivotably fastened to the implement at one end and having a piston rod protruding from the other end which is selectively extendable and retractable in response to the supplying of hydraulic fluid thereto;
- an actuating rod journaled on the implement for rotation about an axis generally parallel to the tine control rods and having a first arm extending away from the axis to pivotably engage the piston rod;
- a second arm fastened to the actuating rod and extending away from the axis thereof to be pivotably linked to the control link means;
- a third arm fastened to the actuating rod and extending away from the axis thereof to be coupled to the mechanical linkage arrangement of the planting implement to place the implement in its disabled and planting modes respectively in unison with the raising and lowering of the tines whereby the only interconnections between the tractor and implement are a hitch for towing the implement and a pair of hydraulic lines from a hydraulic source on the tractor to the hydraulic means;
- the first arm being positioned midway along the actuating rod with the second arm displaced therefrom along the actuating rod axis a predetermined distance; and
- a fourth arm displaced from the first arm along the actuating rod axis said predetermined distance and in a direction opposite the displacement of said second arm from said first arm to be similarly linked for pivoting the tines.

* * * * *